(12) United States Patent
Starr et al.

(10) Patent No.: US 8,881,130 B2
(45) Date of Patent: *Nov. 4, 2014

(54) CO-EXISTING DEDICATED SYSTEM SOFTWARE AND READ/WRITEABLE DATA STORAGE SPACE ON REMOVABLE MEDIA

(75) Inventors: Matthew Thomas Starr, Lafayette, CO (US); Mark Lorin Lantry, Erie, CO (US)

(73) Assignee: Spectra Logic Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,393

(22) Filed: Mar. 1, 2012

(65) Prior Publication Data

US 2012/0159467 A1 Jun. 21, 2012

Related U.S. Application Data

(63) Continuation of application No. 10/950,613, filed on Sep. 27, 2004.

(51) Int. Cl.
*G06F 9/44* (2006.01)
*G06F 9/445* (2006.01)

(52) U.S. Cl.
CPC ..................................... *G06F 9/445* (2013.01)
USPC .......................................................... 717/170

(58) Field of Classification Search
CPC ..................................................... G06F 9/445
USPC .................. 717/174–178, 168–170
See application file for complete search history.

(56) References Cited

U.S. PATENT DOCUMENTS

| | | |
|---|---|---|
| 4,979,054 A | 12/1990 | McCullough et al. |
| 5,758,050 A | 5/1998 | Brady et al. |
| 5,764,992 A | 6/1998 | Kullick et al. |
| 6,226,441 B1 | 5/2001 | Hartung et al. |
| 6,289,405 B1 | 9/2001 | Movall et al. |
| 6,418,111 B1 | 7/2002 | Takemura et al. |
| 6,469,978 B1 | 10/2002 | Ohata et al. |
| 6,606,285 B1 | 8/2003 | Ijtsma et al. |
| 6,710,962 B1 | 3/2004 | Caverly et al. |
| 6,724,701 B2 | 4/2004 | Ijtsma et al. |

(Continued)

FOREIGN PATENT DOCUMENTS

WO WO 2005/010661 2/2005

OTHER PUBLICATIONS

Trevor Kay, "Server+ Certification Bible", 2002, Hungry Minds, Inc., pp. 1-546.*

(Continued)

*Primary Examiner* — Ted T Vo
(74) *Attorney, Agent, or Firm* — Kenneth Altshuler

(57) ABSTRACT

Disclosed is a method and apparatus for mobile media with both dedicated readable and writeable user data space and dedicated readable and writeable drive device space. The mobile data storage media adapted for operatively working with a drive device comprises a data space accessible by an end user and a drive software space accessible by the drive device and inaccessible by an end user. The drive software space is adapted to accommodate firmware for use by the drive device in addition to the reading and writing of software by the drive device. The media is adapted to receive and store software from the drive device or, alternatively, is adapted to transmit software to the drive device.

21 Claims, 15 Drawing Sheets

(56) References Cited

U.S. PATENT DOCUMENTS

| | | |
|---|---|---|
| 6,753,873 B2 | 6/2004 | Dixon et al. |
| 6,760,288 B2 | 7/2004 | Ijtsma et al. |
| 6,763,458 B1 | 7/2004 | Watanabe et al. |
| 2004/0105187 A1 | 6/2004 | Woodruff et al. |
| 2004/0223253 A1 | 11/2004 | Woodruff et al. |
| 2004/0264037 A1 | 12/2004 | Downey et al. |
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2004/0268037 A1 | 12/2004 | Buchanan et al. |
| 2005/0007692 A1 | 1/2005 | Thompson et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0160217 A1* | 7/2005 | Gonzalez et al. ............... 711/6 |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |
| 2006/0070059 A1* | 3/2006 | Starr et al. .................... 717/174 |

OTHER PUBLICATIONS

Autodesk, "Discreet Storage Manager Installation and User's Guide—Storage Discreet", Mar. 2004, Autodesk Canada Inc., pp. 1-140.

Autodesk, "Discreet Storage Manger Release Notes", Mar. 2004, Autodesk Canada Inc., pp. 1-16.

Microsoft TechNet, "What is Removable Storage?", http://technet2.microsoft.com, pp. 1-4, Mar. 2003.

* cited by examiner

CO-EXISTING DEDICATED SYSTEM SOFTWARE AND READ/WRITEABLE DATA STORAGE SPACE ON REMOVABLE MEDIA

CROSS-REFERENCE TO RELATED APPLICATIONS

This is a continuation of previously filed U.S. patent application Ser. No. 10/950,613.

FIELD OF THE INVENTION

The present invention relates generally to software exchanges and upgrades. More particularly, the present invention relates to exchanging software between a dedicated space on a mobile storage media with a drive device adapted for use with the memory media.

BACKGROUND

Storage technology has been on an aggressive trajectory of minimization with hardware and related devices coinciding with an explosive growth in memory capacity. Not only has hardware become smaller and more streamlined, hardware has become more complex and diversified. The once stationary "all-in-one" gigantic machines that dominated computing have diversified to include modular components with high mobility. This is evidenced by mobile storage media adapted to insert into a drive device connected to a computing system for use by an end user.

Modern computing systems generally function by means of an operating system, of which there is a variety, acting as framework for staging the functionality of all other programs. Because hardware devices used with computing systems are themselves becoming more sophisticated with specialized functionality, they require compatible programs to work with the computer's operating system. These programs, typically called drivers, enable computers to cooperate with hardware devices as needed. In addition to drivers, hardware devices often require software programs, typically called firmware, to control their own specialized functionality.

Both drivers and, to a greater extent, firmware are subject to changes which are generally designed to improve the operability of the hardware device. For example, hardware devices such as drives for use with mobile media need to read and write data to the media on behalf of requests from the computing system. The media may have unique data format layouts or compressed data for optimizing data space on the media that are specific to the drive device. In this scenario, the drive device may need special software for use with the media. Additionally, the drive may have motors and actuators, specialized heads, calibrating schemes, etc., that are controlled by firmware in the drive device in order to make the reading and writing of data from the media simple and transparent to the computing system.

Generally, software such as drivers and firmware are loaded or updated by dedicated read only methods. This has been done to prevent an end user from altering or damaging the software. Software used in these applications include "burned" read only CD's, DVD's or other optical recording media, read only updates found at sites on the internet, and other read only mobile media, just to name a few. In some cases, a user may load software onto mobile media for use as described, but that software may be subject to accidental erasure or if "burned" onto a media, and a user only has read access from there on out.

As described above, there are various techniques to transfer software such as drivers and firmware to hardware devices. It is to improvements related to this subject matter that the claimed invention is generally directed.

SUMMARY OF THE INVENTION

The present invention relates to exchanging software between a mobile storage media and a drive device that overcomes the disadvantages and limitations of the prior art by using a drive device dedicated readable and writable space on the media.

One embodiment of the present invention can therefore comprise a multi purpose media comprising: a mobile readable and writeable media adapted for use with a drive device; at least one data space accessible by an end user; at least one drive software space allocated for reading and writing accessibility for the drive device and restricted from the accessibility by the end user, and wherein the drive software space is adapted to contain software readable by the drive device.

Other embodiments of the present invention may additionally comprise a method for adapting mobile readable and writeable media for a drive device comprising: allocating data space accessible by an end user; allocating drive software space accessible for the drive device for reading and writing capability; and restricting accessibility of the drive software space from the end user. The method can further comprise of loading software for the drive device in the drive software space.

Yet a further embodiment of the present invention can also comprise a mobile data storage media adapted for operability with a drive device comprising: a data space accessible by an end user; and a drive software space accessible by the drive device and inaccessible by an end user wherein the drive software space is adapted to accommodate firmware for use by the drive device and the reading and writing of firmware by the drive device, and wherein the media is adapted to receive and store a higher order software from the drive device automatically if the media does not contain the higher order software or the media is adapted to transmit the higher order software to the drive device if the drive device does not contain the higher order firmware.

DETAILED DESCRIPTION

Figure 1A:
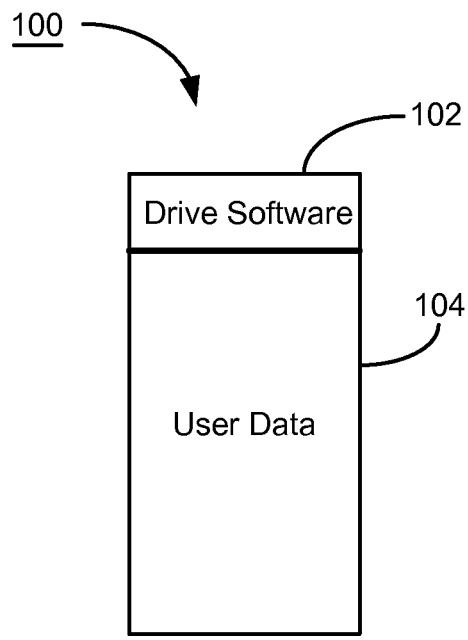
FIG. 1A is a pictorial representation of a mobile readable and writeable media configured in an embodiment of the present invention.

Referring to the drawings in general, and more particularly to FIG. 1A, shown therein is a pictorial representation of a mobile readable and writeable media of configuration 100 constructed in accordance with an embodiment of the present invention. In what follows, similar or identical structure is identified using identical callouts.

Figure 1B:
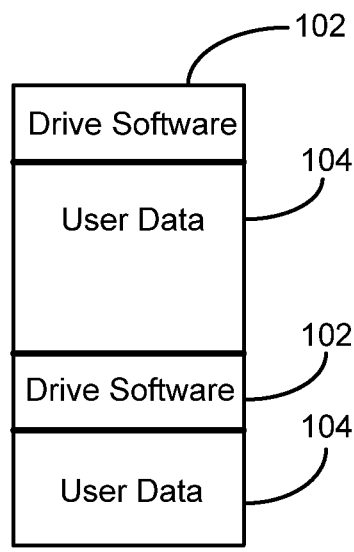
FIG. 1B is an alternative embodiment to FIG. 1A.

Configuration 100 is a diagrammatic illustration of a mobile readable and writeable media having data space 104 accessible for use by an end user and having drive device software space 102 allocated for a drive device. FIG. 1B is an alternative embodiment to 100 illustrating two data spaces 104 and two drive device software spaces 102. Here, in FIG. 1B, the drive software space 102 and the user data space 104 are not contiguous. The mobile readable and writeable media 100 has many equivalence embodying different forms, such as a floppy disc, removable hard disc, a thumb or flash memory media, compact disc (CD) or other optical digital media (such as a DVD), a tape cassette, a media pack, or any combination thereof just to name a few.

Mobile media 100 is generally considered to be media suited for movability between drive devices used to install and/or retrieve data to and from the media. In general, readable and writable media is adapted for use with a drive device, wherein the media is capable of accommodating information written to the media by the drive device in addition to information being extracted, or read, from the media by the drive device. A drive device (such as a tape drive, compact disc drive, floppy disk drive, etc.) is generally coupled with a computing system either by being physically attached or connected to the computing system by wires, for example communication lines, or remotely coupled through a means of communicating such as wireless. Drive devices described herein are envisioned to use memory and computer interface capabilities.

Figure 2A:
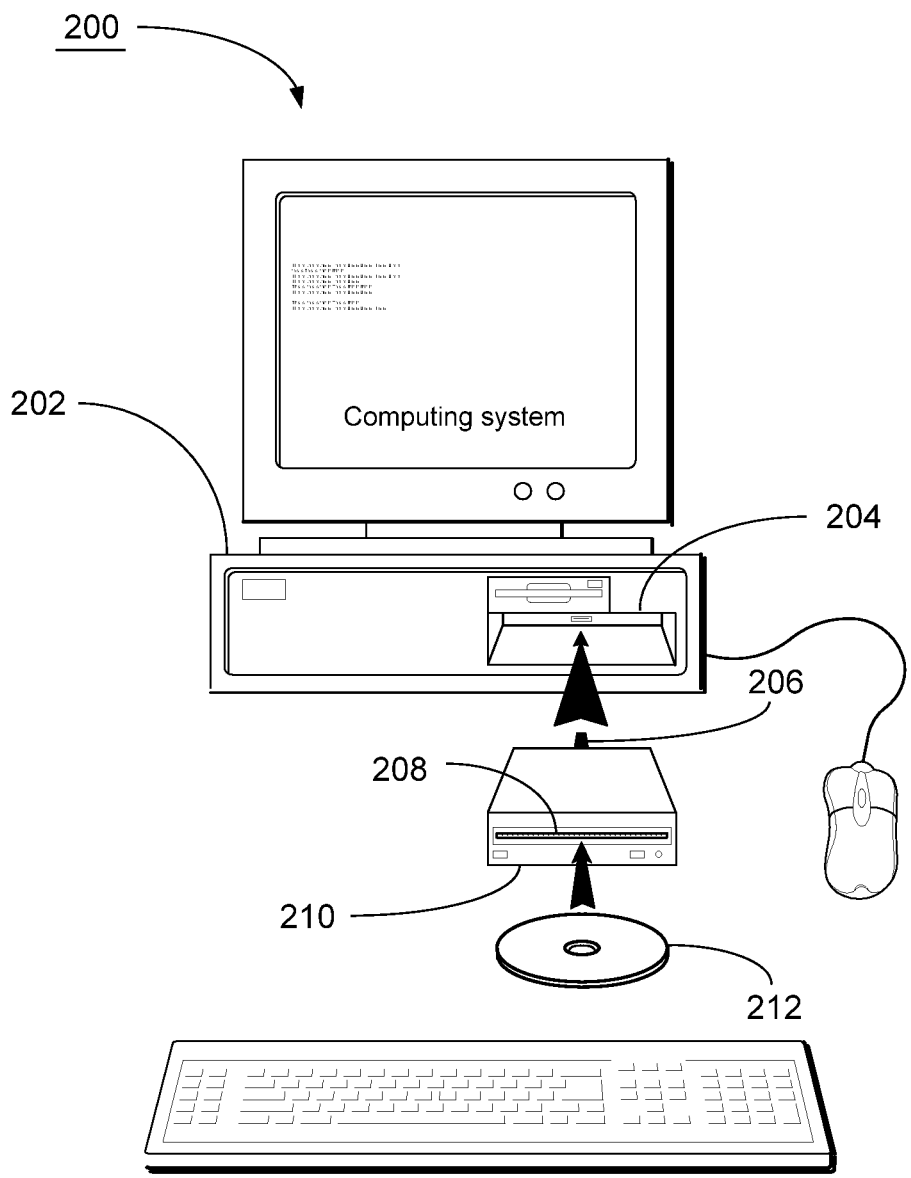
FIG. 2A is a pictorial representation of a computing system with a drive and mobile media.

FIG. 2A serves as an example of mobile media 100 accommodated by a drive device for use with a computing system and end user. Here, a readable/writeable CD drive device 210 that is modular and adapted for connecting to a computing system 202 by means of an IDE (Integrated Drive Electronics) connector 206 is shown in an exploded view. The drive device 210 is contained partially in the computer 202 by an accommodating bay 204. The CD media 212 is accommodated by a receiving opening 208 located on the face of the drive device 210.

Figure 2B:
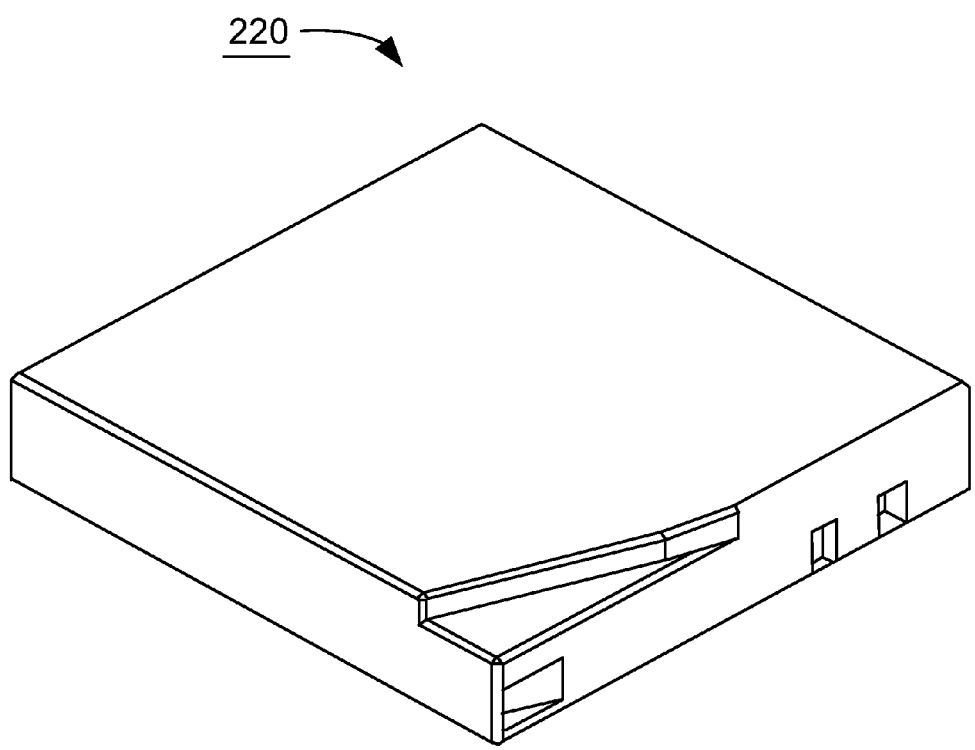
FIG. 2B is a pictorial representation of a digital tape cassette.
Figure 2C:
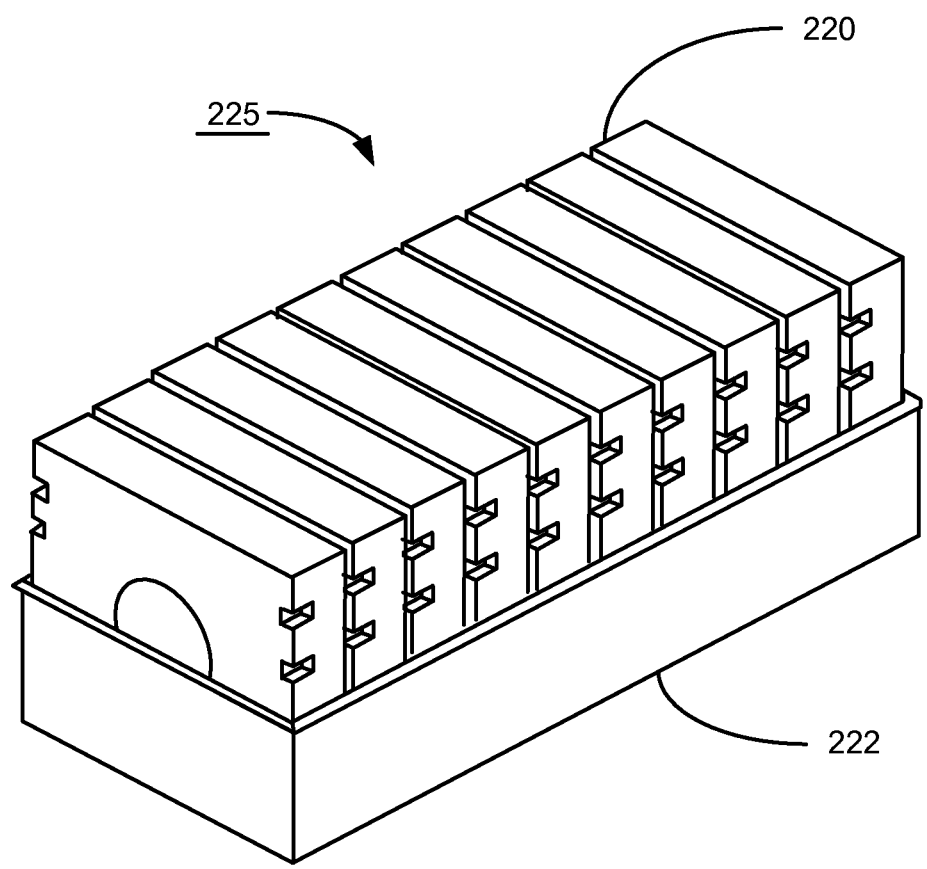
FIG. 2C is a pictorial representation of a tape media pack.
Figure 2D:
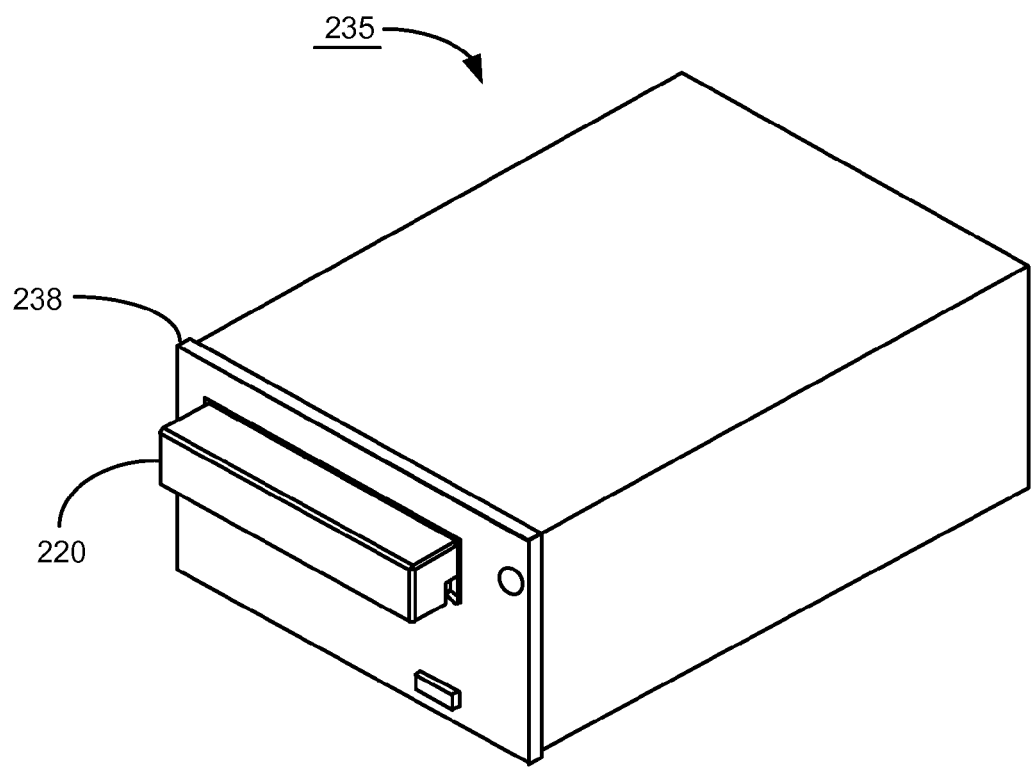
FIG. 2D is a pictorial representation of a tape drive accommodating a digital tape cassette.
Figure 2E:
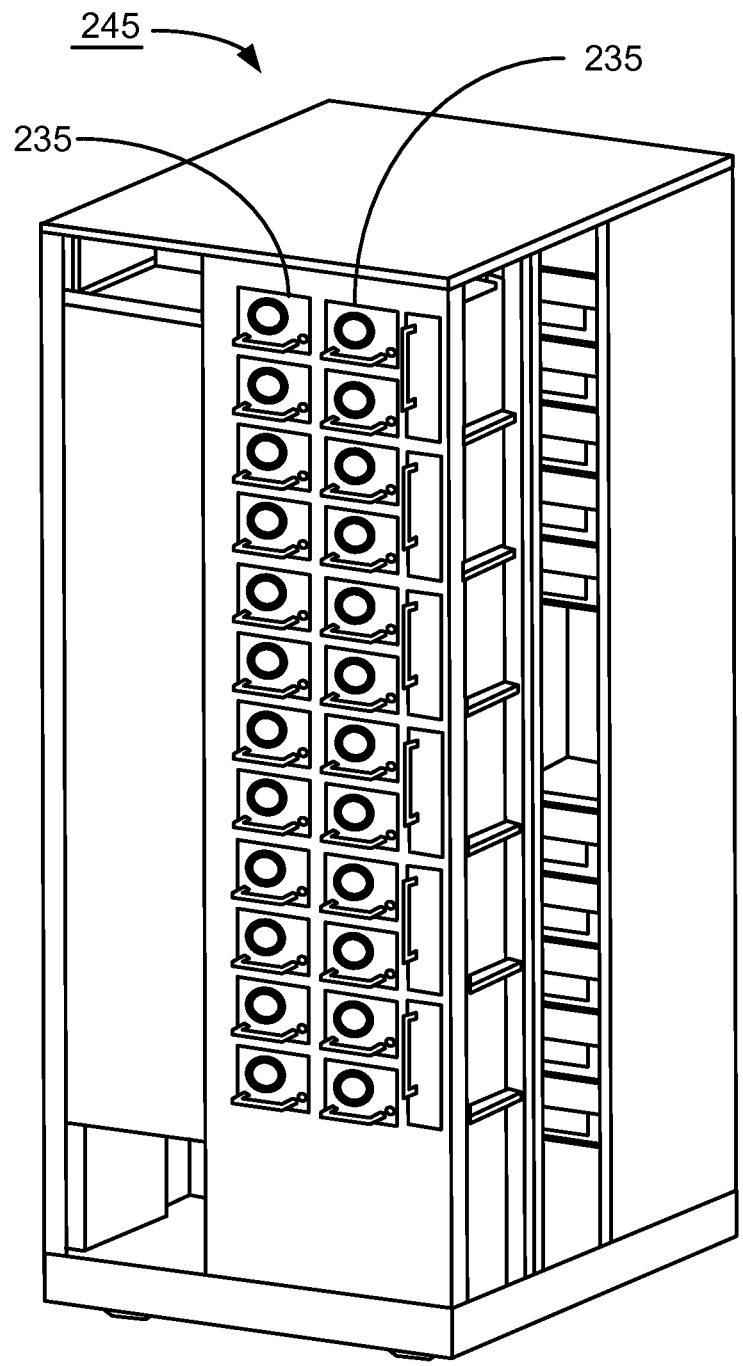
FIG. 2E is a pictorial representation of a tape library.

FIG. 2B-2E serve as examples of mobile media for use with a plurality of data storage drives in a data storage library. FIG. 2B shows a digital tape cassette 220 that substantially contains readable/writable tape media. FIG. 2C shows a media having multiple storage mediums, here a plurality of tape cassettes, such as 220, supported by a magazine 222 to comprise a cassette type media pack 225, in this case, having ten tape cassettes 220. FIG. 2D shows the tape cassette 220 inserted in a tape drive device 235 through an accommodating opening in the drive face 238. A tape library, as shown in FIG. 2E, can comprise a plurality of storage drive devices, such as 235. Furthermore, in one embodiment, the tape library 245 can accommodate a plurality of media packs 225 which are generally manipulated by a robotics means for use with the drives 235. Here, a media pack 225 may be thought of as a single piece of media, such as 100.

Figure 2F:
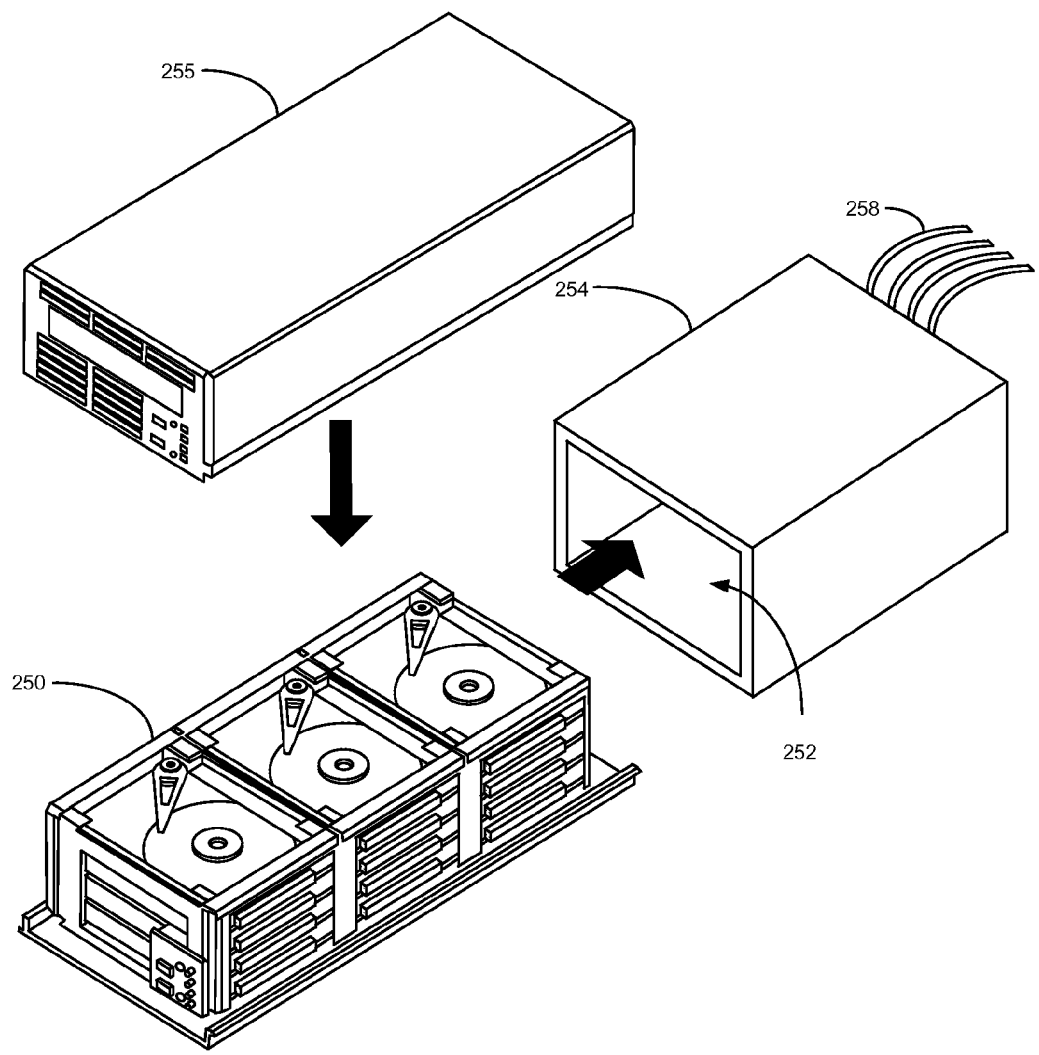
FIG. 2F is a pictorial representation of a mobile disc drive magazine media pack and storage drive device.

FIG. 2F shows another embodiment of a media pack for use with a storage drive device. Here the media pack is comprised of a plurality, of storage mediums, in this case disc drives 250 stacked and contained by an enclosure 255. The mobile media pack is a mobile disc drive magazine 250 and 255, which could be configured as a removable RAID (Redundant Array of Independent Discs [disc drives]) for example. As shown here, the mobile media magazine 250 and 255 can be inserted in an accommodating opening 252 in a mobile disc drive magazine drive device 254 that can be coupled with other memory and/or computing devices by a communications coupling means, such as electrical cables 258. The mobile disc drive magazine drive device 254 could be one of many storage drive devices in a storage library, resembling the tape library 245 in FIG. 2E, with a robotic system capable of transferring a mobile disc drive magazine 255 and 250 much the same way as the digital tape cassette media pack 225 is moved within a tape library 245.

Figure 2G:
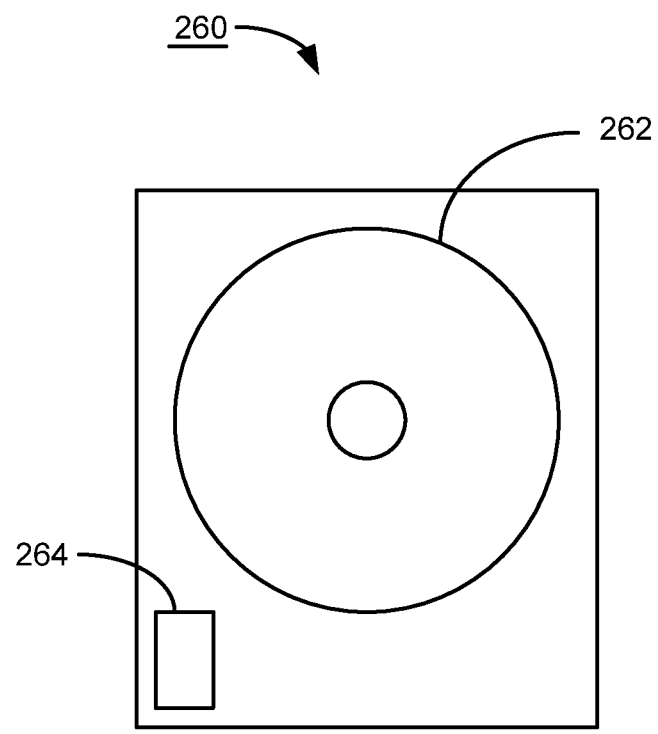
FIG. 2G is a pictorial diagram of a storage media comprised of two different mediums in an embodiment of the present invention.

FIG. 2G shows a basic diagram of a storage media comprised of two different mediums 260 in an embodiment of the present invention. In this embodiment, the storage media 260 has a flash medium 264 and a floppy disc medium 262. As previously disclosed, many different combinations of mediums to form a mobile media, such as 100, are possible and FIG. 2G is illustrative of one example. In an embodiment of 260, the flash medium 264 could be the dedicated drive software portion 102 of the media 260 and the floppy disc medium 262 could be the dedicated user data portion 104 of the media 260. Such combination media may be read by a combination drive, e.g., a single drive capable of reading multiple types of data media, or by separate drives that are each adapted to read one type of data medium, e.g., a drive capable of reading the flash medium 264 and a separate drive capable of reading the floppy disc medium 262.

Figure 3:
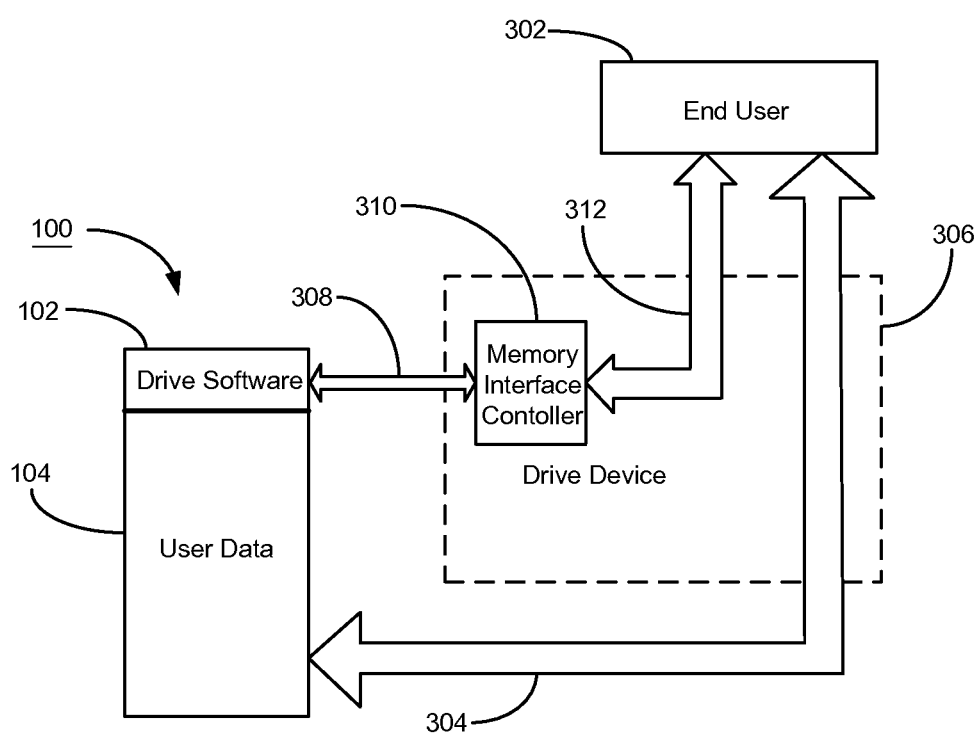
FIG. 3 is a block diagram of an embodiment of the present invention wherein an end user, drive device and mobile media are being used together.

FIG. 3 is a block diagram of an embodiment of the present invention wherein an end user 302, a drive device 306 and mobile media 100 are being used together. Here, the two way data access arrow 304 passes through the drive device 306 to the user data space 104 of the media 100 showing the conventional data path to the media. Here the data access arrow 304 represents direct transfer of data 304 between the end user 302 and the media's 100 user data space 104 via the drive device 306. The drive device 306 handles read/write commands from the end user 302 but determines how that data 304 is read and/or written regarding the user data space 104. The end user 302 is the entity that instructs the drive to write or read data from the media 100. The end user 302 could be a person using a computing system with the drive device 306 and media 100 or alternatively a computing system operating on behalf of instructions to read or write data with the drive device 306 and media 100, just to name a couple examples. In another variation, an end user 302 could be a computing system adapted to send data to be stored in or retrieved from a data library, such as a tape library 245 in FIG. 2E. The end user 302 can also have communication capability 312 with the memory, interface and controller functions 310 of the drive 306. The two way arrow 308 represents the memory, interface and controller functions 310 having read/write accessibility with the drive software space 102. This two way accessibility 308 is generally used by the drive device 306 for loading and retrieving software for the drive device 306 and is restricted from access by the end user 302 and therefore is not a conventional communications/data path with the drive software space 102. However, in another variation the end user 302 is capable of instructing the drive device 306 to commence transmission of software between the drive software space 102 and the memory, interface and controller 310, without having direct access to the drive software space 102. For example, an end user 302 could load a software program into the drive device 306 where then the drive device 306 could load the same software program in the drive software space 102 on a piece of mobile media 100. In another example, the drive device 306 could inform the end user 302 of an update from the mobile media 100 and allow the end user 302 to approve the transmission of the software update from the media 100 to the drive 306.

As previously disclosed, software can include drivers and firmware which are subject to changes based on, for example, user needs or improvement in the operability of a cooperating hardware device, such as 306, just to name two. As a further example, software can include drivers, firmware, and/or updates for components within a data storage device other than the drive itself, such as for the robotic means described in connection with FIG. 2E. Software can also include drivers, firmware, and/or updates for uploading to a computer workstation or server (not shown) that is in data communication with the drive device 306. In this latter situation, increased efficiencies in uploading such software to workstations or servers may be achieved by virtue of commands stored in, for example, the drive software spaces 102, 104, that upload software automatically upon connection of the workstations or servers with the drive device 306. In an embodiment of the present invention, the drive device 306 for use with mobile media 100 is adapted to read and write data 304 to the user data space 104 on behalf of at least a request from the end user 302. The media 100 may have a unique data format, such as compressed data for optimizing data space 104 or encryption, which is specific to the drive device 306. In this embodiment, the drive device 306 may need special software for use with the media 100. Additionally, the drive 306 may have motors and actuators, specialized heads, calibrating schemes, etc., that are controlled by firmware in the drive device 306 in order to make the reading and writing exchange of data 306 with the media user data space 104 simple and transparent to the end user 302.

Figure 4:
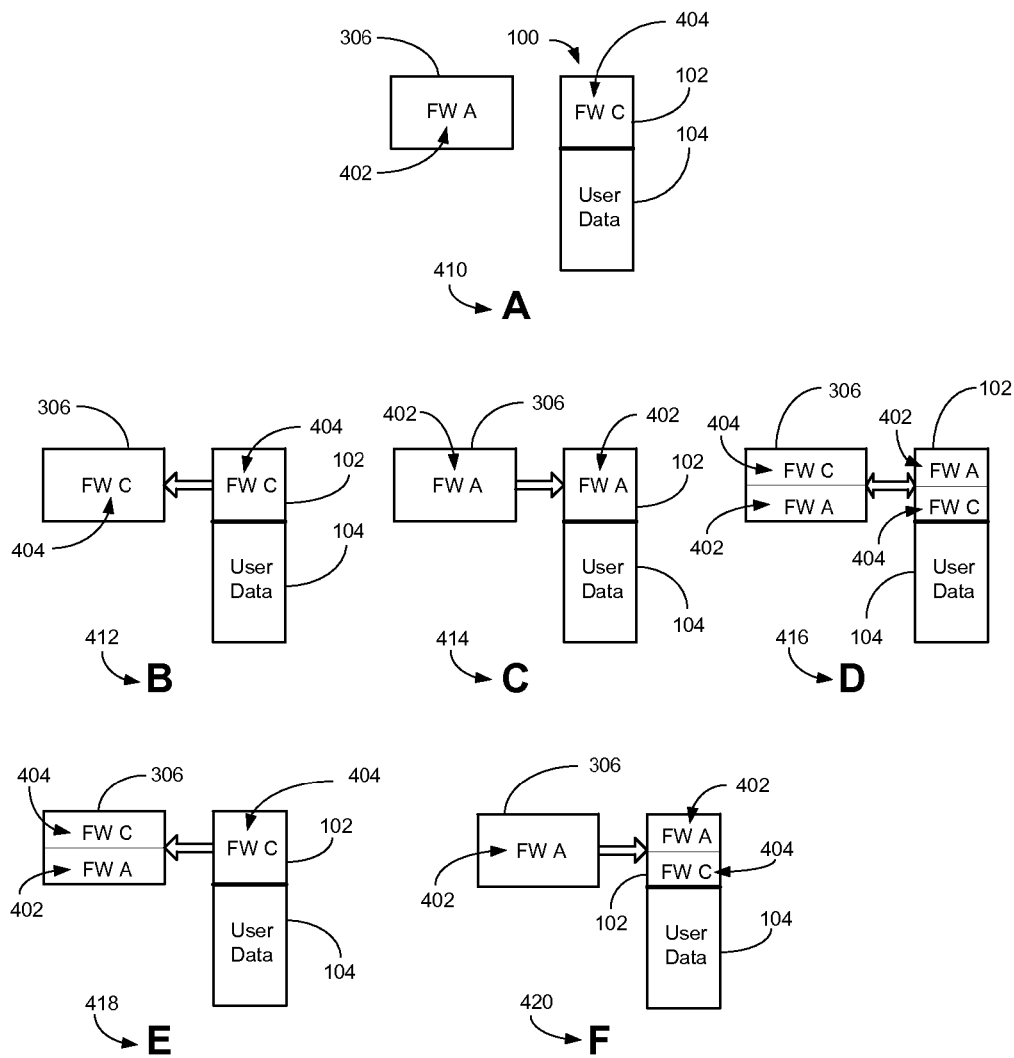
FIG. 4 comprises schematic diagrams of various software transfer scenarios of the present invention between a drive device and media wherein the drive device has lower order software than the media.

Referring to FIG. 4, shown therein are schematic drawings of some embodiments of the present invention whereby the drive device 306 and mobile media 100, adapted to operatively work together, transfer software in various scenarios. Though the scenarios below illustrate the transfer of higher order and lower order software versions, it should be recognized that the reasons for transferring software could be for upgrading, down grading, or facilitating a compatible cooperative working relationship between the media 100 and the drive 306 wherein the software is not limited to higher and lower order versions. Here, the software transfer occurs between the storage drive device 306 which contains a lower order software, or previous version of software, in this case Firm Ware A (FW A) 402, and the mobile media 100 which contains a higher order software, or newer version of software, in this case FW C 404. This is shown in configuration A 410 wherein the drive device 306 contains the lower order FW A 402 and the mobile media 100 contains the higher order FW C 404. It should be recognized that firmware is one kind of software that the media 100 can contain in the drive device software space 102.

The following scenarios shown in FIG. 4 are applied to configuration A 410. Scenario B 412 shows FW C 404 being transferred from the drive software space 102 to replace FW A 402 originally stored in the drive device 306. Scenario B 412 illustrates the drive software space 102 upgrading the drive 306 without preserving the original software FW A 402 in the drive 306. Scenario C 414 shows FW A 402 being transferred from the drive device 306 to replace FW C 404 originally stored in the drive software space 102. Scenario C 414 illustrates the drive 306 downgrading the media 102 without preserving the original software FW C 404. Scenario D 416 shows both the drive 306 and the media drive software space 102 exchanging FW A 402 and FW C 404 while preserving the original software level, 402 and 404, on each 306 and 102. Scenario D 416 illustrates an exchange of software 402 and 404 to be saved on both the drive 306 and in the media space 102 while preserving the software 402 and 404 that was originally there. Scenario E 418 shows FW C 404 being transferred from the drive software space 102 to coexist with FW A 402 originally stored in the drive device 306. Scenario E 418 illustrates the media 102 upgrading the drive 306 while preserving the original software FW A 402 in the drive 306. Scenario F 420 shows FW A 402 being transferred from the drive device 306 without replacing FW C 404 which was originally stored in the drive software space 102. Scenario F 420 illustrates the drive 306 downgrading the media drive software space 102 while preserving the original software FW C 404 in the media drive software space 102.

Figure 5:
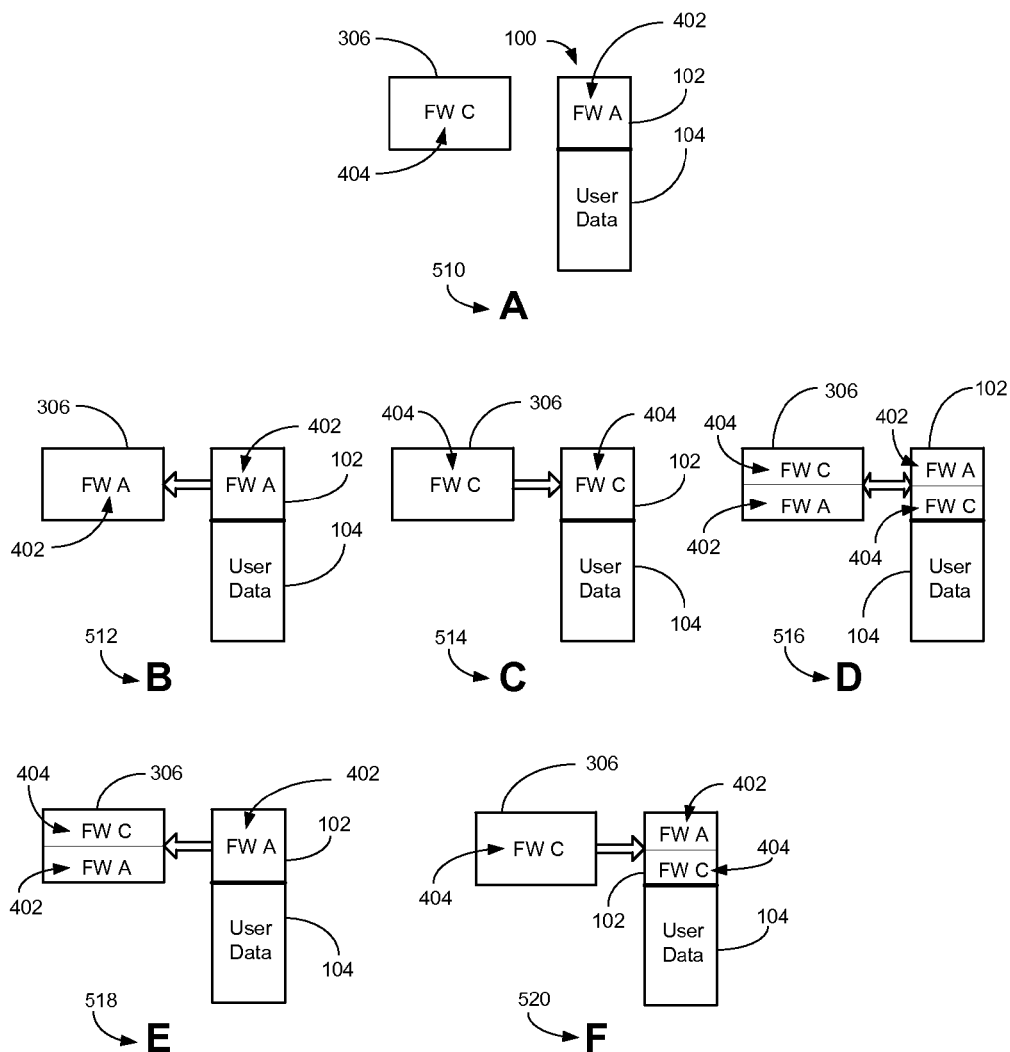
FIG. 5 comprises schematic diagrams of various software transfer scenarios of the present invention between a drive device and media wherein the drive device has higher order software than the media.

Referring to FIG. 5, shown therein are schematic drawings of some embodiments of the present invention whereby the drive device 306 and mobile media 100, adapted to operatively work together, transfer software in various scenarios. The software transfer occurs between the drive device 306 which contains higher order software, FW C 404, and the mobile media 100 which contains lower order software, FW C 402. The following scenarios shown in FIG. 5 are applied to configuration A 510. Scenario B 512 shows FW A 402 being transferred from the drive software space 102 to replace FW C 404 originally stored in the drive device 306. Scenario B 512 illustrates the media 102 downgrading the drive 306 without preserving the original software FW C 404 in the drive 306. Scenario C 514 shows FW C 404 being transferred from the drive device 306 to replace FW A 402 originally stored in the drive software space 102. Scenario C 514 illustrates the drive 306 upgrading the media drive software space 102 without preserving the original software FW A 402. Scenario D 516 shows both the drive 306 and the media drive software space 102 exchanging FW C 404 and FW A 402 while preserving the original software level, 404 and 402, on each 306 and 102. Scenario D 516 illustrates an exchange of software 404 and 402 to be saved on both the drive 306 and in the media space 102 while preserving the original software 404 and 402. Scenario E 518 shows FW A 402 being transferred from the drive software space 102 to coexist with FW C 404 originally stored at the drive device 306. Scenario E 518 illustrates the media drive software space 102 downgrading the drive 306 while preserving the original software FW C 404 in the drive 306. Scenario F 520 shows FW C 404 being transferred from the drive device 306 without replacing FW A 402 which was originally stored in the drive software space 102. Scenario F 520 illustrates the drive 306 upgrading the media 102 while preserving the original software FW A 402 on the media drive software space 102.

Figure 6:
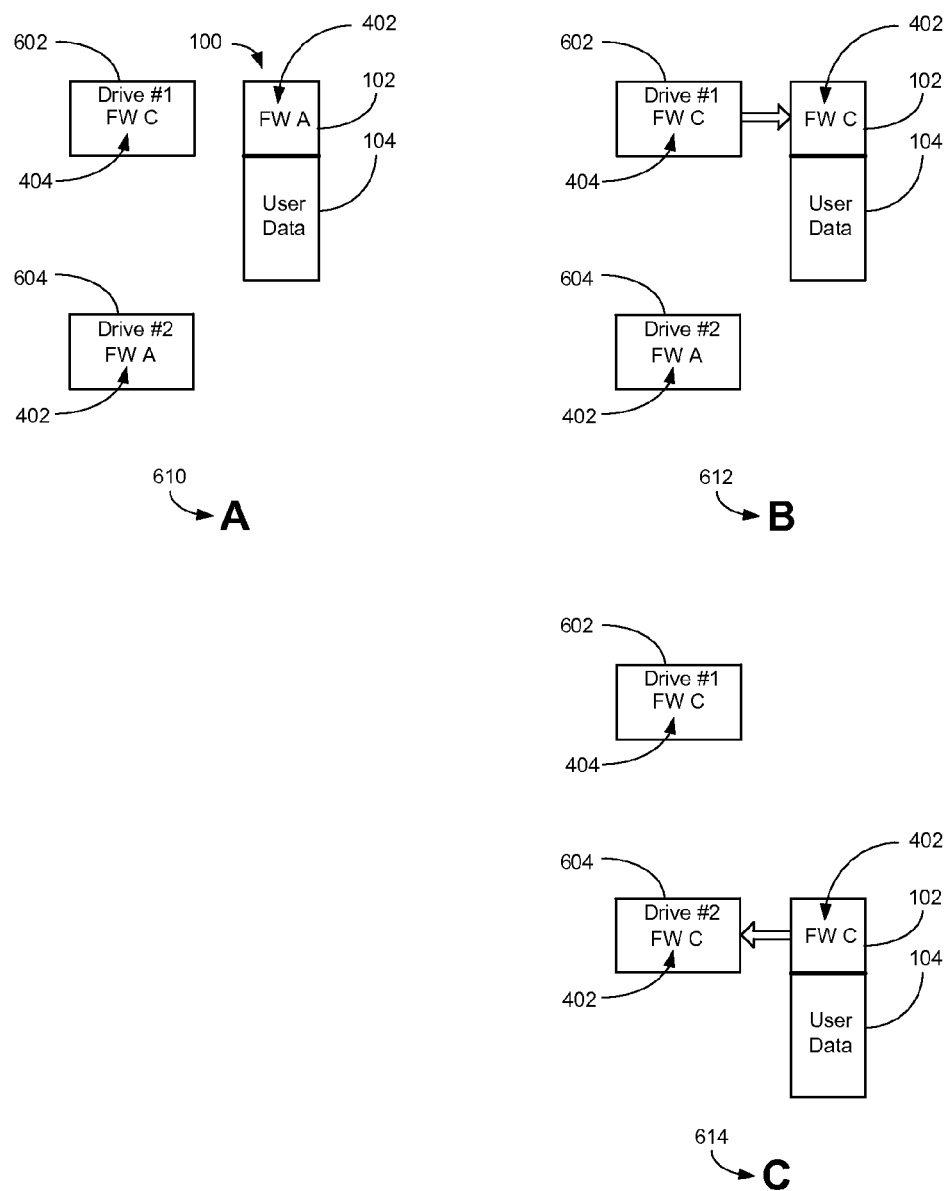
FIG. 6 is a schematic diagram of an embodiment of the present invention showing software exchange between two drives and a common of media.

Referring now to FIG. 6, shown therein is a schematic drawing of an embodiment of the present invention whereby two drive devices 602 and 604 can exchange software by means of the mobile media 100. The following steps in FIG. 6, B 612 and C 614, are applied to scenario A 610. Scenario A 610 illustrates a drive #1 602 having a higher order software FW C 404 and drive #2 604 having a lower order software FW A 402. The media 100 to be used with both drive devices 602 and 604 has a lower order FW A 402 stored in the drive software space 102. Step B 612 shows the drive #1 602 transferring FW C 404 to the mobile media drive software space 102 and replacing FW A 402 located in the drive software space 102. As shown in step C 614, the media drive software space 102 is then used with drive #2 604. Here, the media drive software space 102 is transferring FW C 404 from the drive software space 102 to the drive #2 604 replacing FW A 402 originally residing on drive #2 604. The schematic drawing of FIG. 6 illustrates drive #1 602 upgrading a media 100 whereby the now upgraded media 100 then upgrades the different drive #2 604 with drive #1's 602 FW C 404. This activity could be done automatically by the drive device 306 or could be approved by an end user, such as 302. One example where the schematic of FIG. 6 could work is with the tape library 245 of FIG. 2E.

Figure 7:
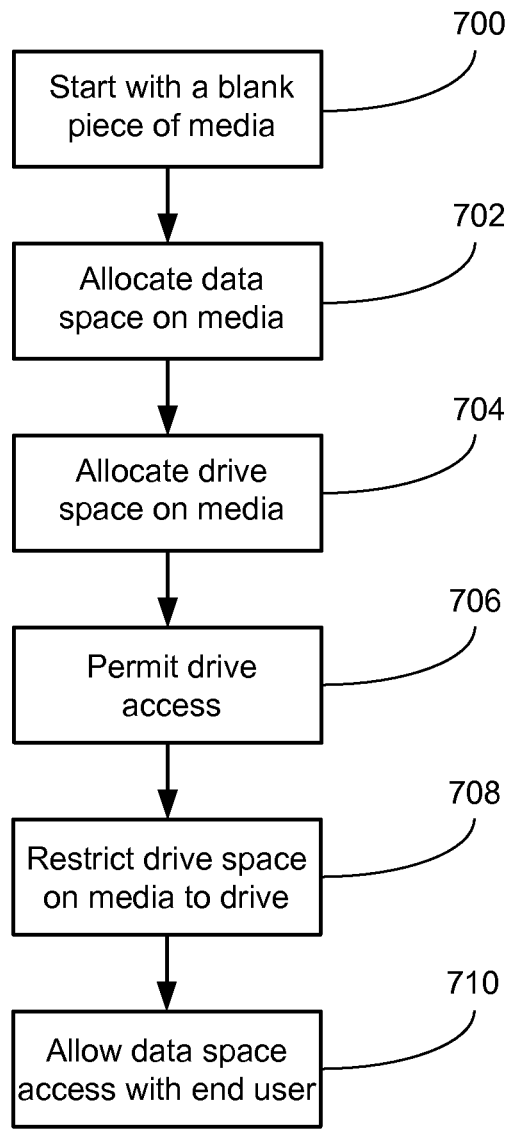
FIG. 7 shows a flow diagram of a method of an embodiment of the present invention by which data space and drive software space are allocated to media.

FIG. 7 illustrates a method of the present invention by which data space 104 and drive software space 102 are allocated to the media 100 adapted to cooperate with a drive device such as 306 in a functional readable and writeable manner. It should be recognized that the steps presented here do not require this particular sequence. In step 700, the process allocating space is generally started with a blank piece of media but can be started with media that is re-formatted prior to use or media that already has allocated space, such as 100, that is prepared or conditioned for the following steps. In step 702, data space 104 is allocated to the media of 700. In step 704, drive software space 102 is allocated to the media of 700. Both steps 702 and 704 could be done at an original equipment manufacturer, whereby a company supporting media, such as 100, or a particular drive device, such as 306, allocates spaces 102 and 104 for an end user 302, for example. Alternatively, steps 702 and 704 could be done by a drive device 306 upon installation of an un-partitioned piece of media 100, for example, wherein there is no dedicated drive software space 102. The media of 700 is configured so that the drive device 306 has access to the drive software space 102, as shown in step 706. Step 708 restricts the drive software space 102 from an end user, such as 302, by a restricting means. The restricting means could be a configuration such as a header or address for the drive software space 102 recognizable by the drive device 306 but not recognizable by the end user 302, for example. In the alternative, the information on the drive software space 102 could be encoded or encrypted so as to be readable by the drive device 306, but not by the end user 302. In step 710, the read/write accessibility of the user data space 104 by the end user 302 is shown. In another embodiment of the present invention, the user data space 104 could have a means, such as an access header for example, by which the only space on the media accessible to the end user 302 is the user data space 104.

Figure 8:
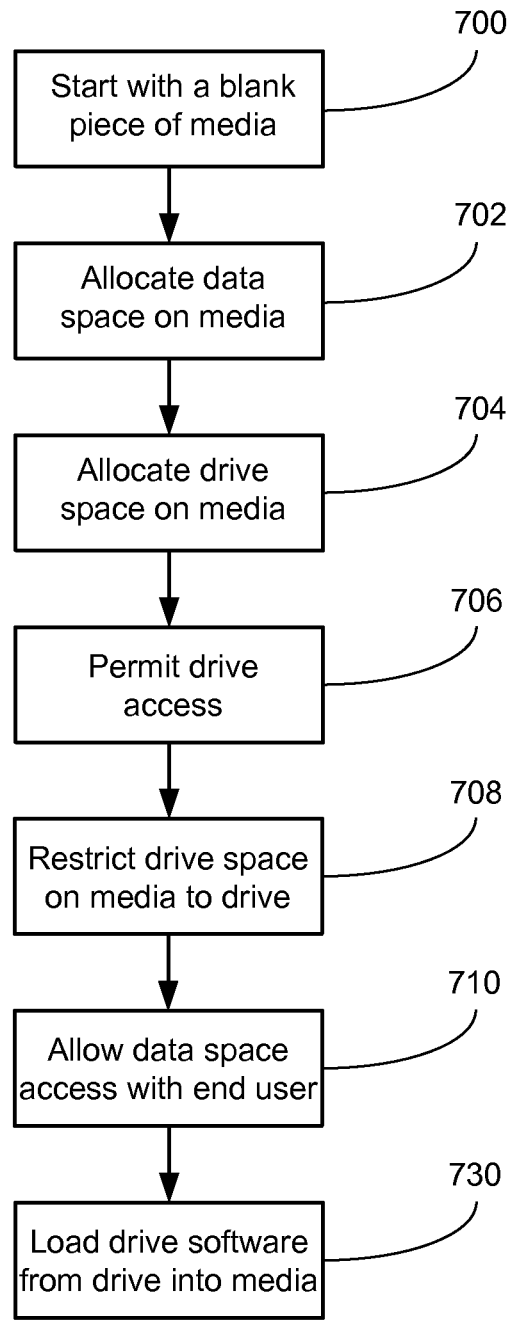
FIG. 8 shows an alternative embodiment of FIG. 7 wherein software is transferred to the drive software space.

FIG. 8 is a method of an alternative embodiment of FIG. 7. As shown by step 730, software is transferred to the drive software space 102. This could be accomplished by the drive device 306 or an OEM, just to name two examples.

Figure 9:
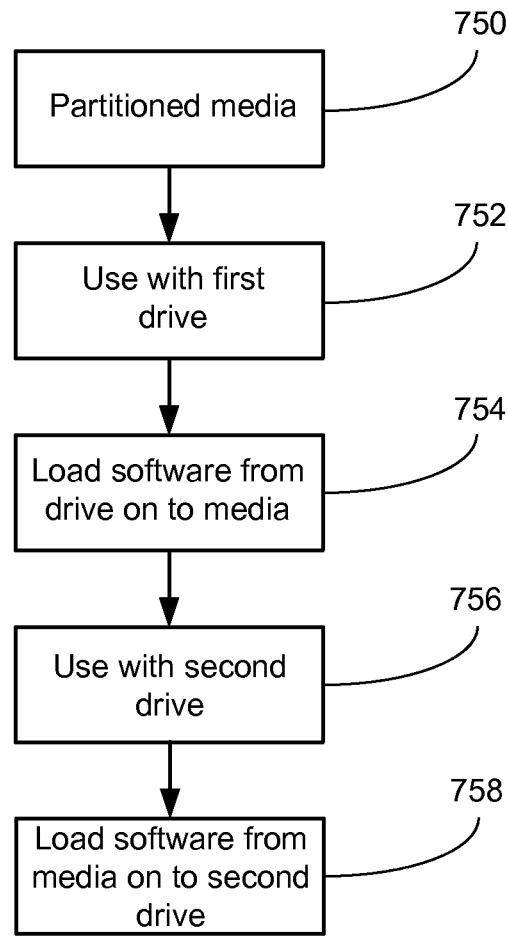
FIG. 9 shows a flow diagram of a method of an embodiment of the present invention illustrating the exchange of software between two drive devices and a common media.

FIG. 9 is a method illustrating the exchange of software between two drive devices, such as 306, with a common piece of media such as 100. Here, the media that is partitioned for drive software space 102 and containing software 750 is used with a first drive device 752. Generally media, such as the media from step 750, is inserted into a drive device, such as 306. The media 100 can be identified by the first drive 752 as having an incompatible data format or sub-optimal drive device firmware, for example. The first drive 752, for example, can inform the end user 302 to a software exchange between the drive 752 and the media 750 or alternatively can automatically proceed with software exchange in order to achieve compatibility, such as loading software from the first drive device 754 to the media 750. The media 750 can then be discharged from use, either temporarily or permanently, with the first drive 750 for use with a second drive 756. Here the media 750 could load software to the second drive 756 in an event that the second drive 756 had an incompatible or sub-optimal software or firmware relative the media 750.

Embodiments of the steps in FIG. 7-9 could be done commercially by a company producing data storage library systems such as Spectra Logic Corporation of Boulder Colo. In one example, the mobile media 100 could be an RXT removable RAID disc drive magazine, much like the mobile disc drive magazine media pack 250 and 255, designed to be compatible with the RXT storage library system. The removable RAID magazine could be formatted into partitions having both user data space, such as 104, and dedicated RXT library software space, such as 102. The manufacturer could load new RXT library firmware in the dedicated software space 102 of the media. In one of many examples disclosed, a customer owning a RXT library may order more memory in the form of one or more removable RAID magazines. Upon installation of a new RXT removable RAID magazine, the RXT library system could access the dedicated software space and may recognize an RXT library firmware upgrade. The RXT library system could then download the firmware upgrade from the new RXT media magazine, and optionally, propagate the new firmware to the dedicated software space 102 in any other removable RAID magazines in the RXT library.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular geometry supporting media and drive devices while maintaining substantially the same functionality without departing from the scope and spirit of the present invention. This may be exemplified by the media, such as 100, having additional partitions for drive software space, such as 102, dedicated to different devices accessibly restricted from at least one end user, such as 302. In addition, although the preferred embodiments described herein are directed to mobile media and drive device technology, it will be appreciated by those skilled in the art that the teachings of the present invention can be applied to other systems without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A mobile flash memory device intended to repetitiously connect with a computing system via a connector, said mobile flash memory device comprising:
    a first partition that is inaccessible by a user of data, said first partition containing compatibility software that when connected to said computing system said compatibility software is adapted to be exchanged with said computing system, said compatibility software to facilitates functioning compatibility between said mobile flash memory device and said computing system; and
    a second partition that is accessible by said user of data when connected to said computing system for storing user data therein.

2. The mobile flash memory device of claim 1 wherein said compatibility software contained in said first partition is a newer version of compatibility software that replaces an older version of compatibility software retained by said computing system.

3. The mobile flash memory device of claim 2 wherein said older version of compatibility software remains retained by said computing system.

4. The mobile flash memory device of claim 1 wherein said compatibility software contained in said first partition is an older version of compatibility software that replaces a newer version of compatibility software retained by said computing system.

5. The mobile flash memory device of claim 4 wherein said older version of compatibility software remains retained by said mobile flash memory device.

6. The mobile flash memory device of claim 1 wherein said compatibility software contained in said first partition comprises driver software that when exchanged with said computing system governs how hardware is controlled in said computing system.

7. The mobile flash memory device of claim 1 wherein said compatibility software is exchanged automatically.

8. The mobile flash memory device of claim 1 wherein said mobile flash memory device retains multiple versions of said compatibility software to facilitate functioning compatibility with a plurality of different computing systems.

9. The mobile flash memory device of claim 8 wherein at least one of said multiple versions of said compatibility software is retained in said mobile flash memory device from an engagement with one of said different computing systems.

10. The mobile flash memory device of claim 1 wherein said computing system possesses a first interface that interfaces between said computing system and said mobile flash memory device via first software when said mobile flash memory device is connected to said computer system via said first interface and a second interface that interfaces between said computing system and said mobile flash memory via second software when said mobile flash memory device is connected to said computer system via said second interface wherein said first and said second software are located in said first partition, said second software is transferred to said mobile flash memory device via said second interface without harming said first software.

11. The mobile flash memory device of claim 1 wherein said computing system possesses a first interface that interfaces between said computing system and said mobile flash memory device via second software that was received by said second interface from said mobile flash memory device to replace first software, said mobile flash memory device received said second software when connected with a second interface operating from said second software.

12. The mobile flash memory device of claim 1 wherein said mobile flash memory device is a thumb media device.

13. A method comprising:
    moving a mobile flash memory device to an interface and connecting said mobile flash memory device with said interface;
    transferring software between said interface and a first partition of memory in said mobile flash memory device, wherein a user of data is restricted from accessing said first partition of memory;
    exchanging user data between said interface and a second partition of memory in said mobile flash memory device for said user of data who has access to said second partition of memory.

14. The method of claim 13 wherein said software is higher order software that replaces lower order software.

15. The method of claim 14 wherein said transferring step is done automatically upon detecting said higher order software either in said mobile flash memory device or a storage device that provides software functionality to said interface.

16. The method of claim 13 wherein said software facilitates compatibility between said mobile flash memory device and said interface.

17. The method of claim 13 further comprising authorizing said transferring step by said user of data.

18. The method of claim 13 further comprising:
    detecting higher order software being used by a first interface than that which is retained in said first partition of memory when said mobile flash memory device is connected with said first interface, said first partition of memory containing lower order software;
    uploading said higher order software in said first partition of memory;
    moving said mobile flash memory device to a second interface and connecting said mobile flash memory device with said second interface;
    detecting said lower order software being used by said second interface;
    downloading said higher order software from said first partition of memory to said second interface for use by said second interface.

19. A method comprising:
    providing a mobile flash memory device that possesses a first partition that essentially restricts accessibility to a user of data and a second partition that is accessible by said user of data for storing user data therein;
    e) moving said mobile flash memory device to a second interface;
    f) connecting said mobile flash memory device with said second interface, said mobile flash memory device is intended to be repetitiously connected with said second interface;
    g) detecting said lower order software being used by said second interface compared with said higher order software which is retained in said first partition when said mobile flash memory device is connected with said second interface;
    h) downloading said higher order software from said first partition to said second interface; and
    i) forming operable cooperation between said mobile flash memory device and said second interface via said higher order software.

20. The method of claim 19 further comprising before step e:
- a) moving said mobile flash memory device to a first interface;
- b) connecting said mobile flash memory device with said first interface, said mobile flash memory device is intended to be repetitiously connected with said first interface;
- c) detecting, when said mobile flash memory device is connected with said first interface, said higher order software being used by said first interface while said lower order software is retained in said first partition;
- d) uploading said higher order software being used by said first interface to said first partition.

21. A mobile memory device that is selectively connectable with a computing system so that a user can transfer user data to and from the mobile memory device via an interface with the computing system, the mobile memory device comprising:
- a first partition that is formatted to be operably accessible only by the computing system when connected therewith, not by the user via the interface, to manage compatibility information related to the computing system; and
- a second partition that is formatted to entirely store the user data and is operably accessible by the user via the interface.

\* \* \* \* \*